(12) United States Patent
Marchisio et al.

(10) Patent No.: US 9,569,690 B2
(45) Date of Patent: *Feb. 14, 2017

(54) AUTOMATED AND SCALABLE OBJECT AND FEATURE EXTRACTION FROM IMAGERY

(71) Applicant: DigitalGlobe, Inc., Longmont, CO (US)

(72) Inventors: Giovanni B. Marchisio, Longmont, CO (US); Mark D. Tabb, Longmont, CO (US); Carsten Tusk, Longmont, CO (US); Krzysztof Koperski, Longmont, CO (US); Jeffrey D. Shafer, Longmont, CO (US)

(73) Assignee: DigitalGlobe, Inc., Longmont, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/826,740

(22) Filed: Aug. 14, 2015

(65) Prior Publication Data

US 2015/0356373 A1    Dec. 10, 2015

Related U.S. Application Data

(63) Continuation of application No. 14/024,399, filed on Sep. 11, 2013, now Pat. No. 9,141,872.

(51) Int. Cl.
*G06K 9/46* (2006.01)
*G06K 9/66* (2006.01)
(Continued)

(52) U.S. Cl.
CPC ........... *G06K 9/4647* (2013.01); *G06K 9/0063* (2013.01); *G06K 9/46* (2013.01); *G06T 5/40* (2013.01);
(Continued)

(58) Field of Classification Search
CPC ...... G06K 9/4647; G06K 9/46; G06K 9/0063; G06K 2009/4657; G06T 5/40; G06T 2207/10016; G06T 2207/10036; G06T 2207/20182; G06T 2207/30181; H04N 1/4074
(Continued)

(56) References Cited

U.S. PATENT DOCUMENTS 6,281,814 B1 *  8/2001  Sasaoka ................ G06F 17/148
                                                    341/50
7,019,777 B2 *  3/2006  Sun ....................... H04N 3/1593
                                                    348/262

(Continued)

OTHER PUBLICATIONS

Goldstein, Tom and Osher, Stanley, The Split Bregman Method for L1 Regularized Problems, available at ftp://ftp.math.ucla.edu/pub/camreport/cam08-29.pdf May 7, 2009.

(Continued)

*Primary Examiner* — Kanjibhai Patel
(74) *Attorney, Agent, or Firm* — Marsh fischmann & Breyfogle LLP

(57) ABSTRACT

Feature extraction of image data using feature extraction modules. The feature extraction modules may be provided in an architecture that allows for modular, decoupled generation and/or operation of the feature extraction modules to generate feature data corresponding to image data. In this regard, the feature extraction modules may communicate with a file system storing image data and feature data by way of a common interface format. Accordingly, regardless of the nature of the execution of the feature extraction module, each feature extraction module may be communicative by way of the common interface format, thereby providing a modular approach that is highly scalable, flexible, and adaptive.

35 Claims, 8 Drawing Sheets

(51) Int. Cl.
  *H04N 1/407* (2006.01)
  *G06T 5/40* (2006.01)
  *G06K 9/00* (2006.01)
(52) U.S. Cl.
  CPC .... *H04N 1/4074* (2013.01); *G06K 2009/4657* (2013.01); *G06T 2207/10016* (2013.01); *G06T 2207/10036* (2013.01); *G06T 2207/20182* (2013.01); *G06T 2207/30181* (2013.01)
(58) Field of Classification Search
  USPC .......................................... 382/190–191, 299
  See application file for complete search history.

(56) References Cited

U.S. PATENT DOCUMENTS

| | | | |
|---|---|---|---|
| 7,298,869 | B1 | 11/2007 | Abernathy |
| 7,577,297 | B2 | 8/2009 | Mori et al. |
| 8,155,391 | B1* | 4/2012 | Tang ................. G06K 9/00651 382/113 |
| 8,209,172 | B2 | 6/2012 | Mitarai et al. |
| 8,379,940 | B2 | 2/2013 | Wechsler et al. |
| 8,660,359 | B2* | 2/2014 | Conger ............... G06K 9/0063 382/191 |
| 8,761,508 | B2 | 6/2014 | Kimura et al. |
| 8,856,129 | B2 | 10/2014 | Cai et al. |
| 2010/0098342 | A1* | 4/2010 | Davis ................. G06K 9/0063 382/220 |
| 2013/0039574 | A1 | 2/2013 | McKay et al. |

OTHER PUBLICATIONS

Dalal, Navneet and Triggs, Bill, Histograms of Oriented Gradients for Human Detection, International Conference on Computer Vision and Pattern Recognition Jan. 1, 2005.

Hall-Beyer, The GLCM Tutorial Home PAge, Version 2.10n available at http://www.fp.ucalgary.ca/nnhallbey/tutorial.htm Feb. 21, 2007.

Bahram Salehi et al., 'Automatic Moving Vehicles Information Extraction From Single-Pass WorldView-2 Imagery', IEEE Journal of Selected Topics in Applied Earth Observation and Remote Sensing, vol. 5, No. 1, pp. 135-145, Feb. 2012 ("http://ieeexplore.ieee.org/xpls/abs_all.jsp?arnumber=6145661").

Oivind Due Trier. 'Urban green structure', Jan. 28, 2010 ("http://www.nr.no/en/nrpublication?query=/file/5194/Trier_-_Urban_green_structure._State_of_the_art_of_classif.pdf").

Peng Liu et al.,'Restoration of multispectral images by total variation with auxiliary image', Optics and Lasers in Engineering, vol. 51, Issue 7, pp. 873-882, Jul. 2013 ("http://www.sciencedirect.com/science/article/pii/SO143816613000572").

Yi Yang et al., 'Geographic Image Retrieval Using Local Invariant Features', IEEE Transactions on Geoscience and Remote Sensing, vol. 51, No. 2, pp. 818-832, Feb. 2013 (http://ieeexplore.ieee.org/xpl/articleDetails.jsp? arnumber=6257473).

\* cited by examiner

AUTOMATED AND SCALABLE OBJECT AND FEATURE EXTRACTION FROM IMAGERY

CROSS-REFERENCE TO RELATED APPLICATION

This application is a continuation of U.S. Non-Provisional application Ser. No. 14/024,399 filed on Sep. 11, 2013, entitled "AUTOMATED AND SCALABLE OBJECT AND FEATURE EXTRACTION FROM IMAGERY," the contents of which are incorporated by reference herein as if set forth in full.

BACKGROUND

The use of geospatial imagery has increased in recent years and represents a significant tool that may be utilized in a number of contexts. As such, high quality geospatial imagery has become increasingly valuable. For example, a variety of different entities (e.g., individuals, governments, corporations, or others) may utilize geospatial imagery (e.g., satellite imagery). As may be appreciated, the use of such satellite imagery may vary widely such that geospatial images may be used for a variety of differing purposes.

With increasingly capable satellites being commissioned and launched, very high resolution (VHR) remotely-sensed multispectral Earth imagery has become increasingly available and useable. For example, as the number of satellite image acquisition systems in operation grows, acquisition ability and flexibility improves. In an example, Digital-Globe, Inc. of Longmont, Colo. currently operates a number of satellites including, IKONOS, GeoEye-1, QuickBird, WorldView 1, and WorldView 2, with an anticipated launch of WorldView 3. Accordingly, around the clock global coverage may be achieved though the satellite constellation currently in operation. As such, the DigitalGlobe constellation of satellites can image the entire Earth's landmass every 75 days and may capture over six times the Earth's landmass every year with a capacity to collect at least 2.6 million square kilometers of imagery a day. With selective tasking, DigitalGlobe's satellite constellation may quickly and continually collect imagery from targeted locations to provide near real time feedback on global events or the like.

Furthermore, the resolution of image acquisition satellites also continues to increase. For instance, currently operated satellites may have a maximum spatial resolution of 50 cm (wherein each pixel in the resulting images acquired corresponds with the distance measure of the spatial resolution). Additionally, planned satellite launches may provide even greater resolution capabilities with spatial resolutions as high as about 30 cm.

In this light, the amount and quality of VHR remotely-sensed multispectral Earth imagery continues to increase as does the amount and types of image data collected. Accordingly, the nature of the VHR remotely-sensed multispectral Earth imagery may facilitate uses beyond simply providing pixels as image data. For instance, higher level data processing may be applied to the images to, for example, identify objects, identify textures, or otherwise extract useful data from the raw image data. In this regard, as the amount of image data that is available grows and the nature of the image data acquired changes and is improved, advanced image data processing and image analytics are needed to keep pace with the advances in image acquisition technology.

SUMMARY

In view of the foregoing, the present disclosure relates to feature extraction from very high resolution (VHR) remotely-sensed Earth imagery such as satellite imagery or the like. VHR imagery may comprise remotely sensed imagery with a resolution not less that about 20 m, not less than about 10 m, not less than about 5 m, or even not less than about 1 m. In this regard and in some embodiments, VHR imagery may make a resolution as high as 0.50 m or greater. Specifically, the present disclosure includes architecture and related methodology that facilitates modular and decoupled generation and/or operation of feature extraction modules that may be executed in a system to facilitate highly scalable and rapidly evolving techniques for feature extraction. In this regard, the feature extraction facilitated by the disclosure presented herein may provide a base architecture that may support a wide variety of solutions, analytics, or other actionable data that may be facilitated thorough analysis of VHR remotely-sensed Earth imagery. In this regard, the architecture described herein may be used in a variety of specific applications for analysis of VHR remotely-sensed Earth imagery including, for example, data mining and indexing, object detection, land use analysis, land cover analysis, change identification, or other applications without limitations. In at least some embodiments described herein, the architecture described may also facilitate autonomous image analysis that may automatically utilize one or more feature extraction modules to extract feature data from image data. For example, hierarchical factor extraction models may be provided that perform to generate feature data based on other faster data generated by other feature extraction modules.

Additionally, a number of specific feature extraction modules are also detailed in this disclosure. As may be appreciated, analysis of VHR remotely-sensed Earth imagery may present some challenges unique to the nature of the images collected. For instance, while existing image detection techniques may make certain assumptions about the orientation of images (e.g., that human figures to be recognized are standing or vertically oriented in an image), these types of assumptions may not be applicable to VHR remotely-sensed Earth imagery. For instance, the orientation of objects (e.g., as defined by their edges or other salient feature to be used to identify the object or feature) in VHR remotely-sensed Earth imagery may be provided at any one or more of a variety of orientations or at random. For instance, naturally occurring geographic phenomena, human made objects, or other types of features, objects, etc. to be identified in VHR remotely-sensed Earth imagery may not be regularly oriented in the images to be analyzed. Accordingly, previously proposed feature extraction techniques that make certain assumptions about the orientation of an image or that are specifically tailored to analyze an image with a given orientation may not be suited to analysis of VHR remotely-sensed Earth imagery. In this regard, at least some of the feature extraction modules described herein may be rotationally invariant.

A first aspect includes a method for extracting feature data from very high resolution (VHR) remotely-sensed multispectral Earth imagery. The method includes storing VHR remotely-sensed multispectral Earth image data in a file system and providing a plurality of feature extraction modules. Each respective feature extraction module is operable to analyze the image data to generate feature data regarding the image data. As such, the method includes accessing the VHR remotely-sensed multispectral Earth image data in the file system with one or more of the plurality of feature extraction modules, wherein the one or more feature extraction modules each access the file system using a common interface format. The method further includes executing the one or more feature extraction modules to generate feature data corresponding to the VHR remotely-sensed multispectral Earth image data and receiving the feature data at the file system from the one or more feature extraction modules. The feature data is received from each of the one or more feature extraction modules using the common interface format.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For example, in an embodiment, the VHR remotely-sensed multispectral Earth image data may include spectral band data corresponding to at least 8 multispectral bands. In this regard, the multispectral bands may collectively range from at least about 300 nanometers in wavelength to at least about 1100 nanometers in wavelength. Additionally, the image data may further include a plurality of short-wavelength infrared (SWIR) bands. The plurality of SWIR bands may range from at least about 1100 nanometers in wavelength to at least about 2400 nanometers in wavelength.

In an embodiment, the feature information received from the one or more feature extraction modules may be stored in corresponding relation to the portion of the VHR remotely-sensed multispectral Earth image data from which the feature data was generated. Furthermore, in an embodiment, at least two of the plurality of feature extraction modules comprises different programming languages. For instance, the plurality of feature extraction modules may be independently developed and each communicate with the file system using the common interface format. Accordingly, the common interface format comprises a feature identifier and an image identifier. The feature identifier may correspond with particular feature data generated by a given feature extraction module. Additionally, the image identifier comprises an indication of a portion of the image for which feature data is to be generated.

In an embodiment, the method may also include determining a subset of the plurality of feature extraction modules required to generate feature data, wherein first feature data generated from the execution of a first feature extraction module is used during the executing of a second feature extraction module to generate second feature data. The determining may also include ordering the execution of the subset of feature extraction modules. Also, the method may include distributing an initialization command to each of the subset of the plurality of feature extraction modules, wherein the initialization command comprises a feature identifier and an image identifier according to the common interface format. In an embodiment, at least one of the feature extraction modules generates feature data prior to receiving a request for the feature data from an image processing module. Additionally or alternatively, at least one of the feature extraction modules may generate feature data on demand in response to a request for the feature data from an image processing module. The determining may be at least partially based on a feature of interest to be identified from the image data as requested from an imaging processing module.

The feature extraction modules may generally be any appropriate module that is operable to generate feature data. For example, the feature extraction modules may include a fractal dimension feature extraction module, a total variational feature extraction module, a rotationally invariant histogram of gradients (HOG) feature extraction module, a Gabor wavelet feature extraction module, a clustering histogram feature extraction module, or any other appropriate feature extraction module.

Accordingly, the fractal dimension feature extraction module may be operative to generate feature data by identifying an image of a predetermined size of pixels, dividing the image into a plurality of abutting square windows having a side dimension less than the predetermined size of the image, and constructing for each plurality of abutting square windows a column having a height as represented in increments of the side dimension of the abutting window. The height of the column may be determined such that the ratio of the predetermined size of the image to the side dimension of the abutting windows equals the ratio of a maximum pixel value for a given multispectral band of the image to the height. The squared side dimension and the height may represent a plurality of boxes whose volume is defined by increments of the side dimension. In this regard, the fractal dimension feature extraction module may determine, for each abutting window a box from the plurality of boxes in which a maximum pixel value and a minimum pixel value occur and may calculate, for each of the plurality of abutting windows, the number of boxes separating the box in which the maximum pixel value is disposed and the box in which the minimum pixel value is disposed. The module may also sum the number of boxes separating maximum and minimum pixel levels over all of the plurality of abutting windows to generate a summed value. In turn, the module may repeat each of the constructing, determining, calculating, and summing operations for all possible values of the side dimension of the plurality of abutting windows such that each side dimension is less than or equal to half of the predetermined size of the image and at least greater than three pixels in length. Additionally, the module may plot each summed value generated in the repeating step to determine a slope of the summed values, wherein the slope comprises the fractal dimension of the image.

In an embodiment, the image of the predetermined size is a subset portion of a larger image. In turn, the fractal dimension may be calculated for each subset portion of the larger image is used to generate a fractal map comprising an aggregated mapping of the fractal values of each subset portion over the larger image. As such, a fractal map may be generated for each spectral band of a multispectral image. The fractal dimension may be at least partially dependent upon the spectral band, wherein each fractal map is independently generated of other fractal maps of the other spectral bands of the plurality of spectral bands.

In another embodiment, at least one of the feature extraction modules may include a total variational (TV) feature extraction module. The TV feature extraction module may include a multispectral filtering module using a plurality of spectral bands of an image to generate a filtered image corresponding to the image. The number of spectral bands used in the filtering operation may be at least 8 multispectral bands. The filtering operation may include minimizing a function including at least a first term representing the difference between the original image and the filtered image and at least a second term representing the spatial homogeneity of the filtered image. In this regard, the first term and the second term may include a multivalued vector for each pixel representative of the image or filtered image, respectively, wherein the multivalued vector values include a component for each row, column, and multispectral band in the image. At least one of the first term or the second term include an L1 norm. Additionally, the second term is weighted by a smoothing factor. The minimization of the function may be solved using a Split Bregman technique. The Split Bregman technique may include Gauss-Seidel updates. In this regard, the minimization is solved by execution on a graphics processing unit (GPU).

In an embodiment, at least one of the feature extraction modules may include a rotational invariant histogram of gradients (HOG) feature extraction module. The rotational invariant HOG feature extraction module may be operative to generate feature data by establishing a plurality of angular bins for an image in a gradient domain, histogramming gradients from the image with respect to the plurality of angular bins, and selecting based on the histogramming the angular bin with the largest histogram value to define a primary direction. Additionally, the module may set a plurality of pooling windows with relative offsets from a pixel of interest and define a gradient orientation window encompassing the plurality of pooling windows. The module may configure the gradient orientation window to align the configuration of the gradient orientation window relative to the primary direction. Also, the module may shift the positions of the pooling windows relative to the gradient orientation window based on the configuring. The module may also rotate the internal orientation of the pooling windows based on the configuring.

In an embodiment, the shifting may include shifting the pooling windows relative to the gradient orientation window by a number of bins determined in the selecting step. The rotating may also include shifting the internal orientation of the pooling windows by a number of bins determined by the rotating step. Accordingly, a HOG is calculated relative to each of the shifted and rotated pooling windows. The calculating may include using an integral image to calculate the HOG feature for each pooling window.

In an embodiment, at least one of the feature extraction modules may include a Gabor wavelet feature extraction module. The Gabor wavelet feature extraction modules may be operative to generate feature data by applying a plurality of Gabor wavelet functions to an image, wherein each of the plurality of Gabor wavelet function includes a different orientation and computing at least one feature based on at least two of the plurality of Gabor wavelet functions. For example, the at least one feature may include at least one of a sum of the absolute values of a first Gabor wavelet function of the plurality of Gabor wavelet functions and a second Gabor wavelet function of the plurality of Gabor wavelet functions, a sum of the magnitude of values of the product of each perpendicularly oriented Gabor wavelet function of the plurality of Gabor wavelet functions, or the difference of the maximum and minimum values of magnitude of all of the plurality of Gabor wavelet functions for all image data. As such, for each orientation of the plurality of Gabor wavelet functions, a plurality of different Gabor wavelet functions with a different scale are calculated. The different scales may include varied values for at least one of a wavelength of the Gabor wavelet function or an envelope of the Gabor wavelet function. Each of the plurality of Gabor wavelet functions may be applied to each pixel of each multispectral band of an image comprising a plurality of multispectral bands. At least one feature may be determined independently for each of the plurality of bands. Additionally or alternatively, the at least one feature may be determined with respect to all of the plurality of bands.

In an embodiment, at least one of the feature extraction modules may include a clustering histogram feature extraction module for extraction of features based on clustered and classified spectra values. The clustering histogram feature extraction module may be operative to generate feature data by assigning each pixel of an image into one of a plurality of a predefined classes and identifying a kernel surrounding each pixel containing a plurality of others pixels from the image, wherein each of the plurality of other pixels have been assigned into one of the plurality of predefined classes. Furthermore, the module may build a histogram for each pixel based on the number of other pixels in each of the plurality of predefined classes relative to the pixel for which the histogram is built. The plurality of predefined classes may correspond to identified land classifications based on at least one of land use or land class. The pixels may be assigned into a predefined class based on the radiometric properties of a pixel used in a clustering technique. The clustering technique may include at least one of k-means clustering, a Euclidean distance approach, or a Mahalanobis distance approach.

A second aspect includes a system for generating feature data from very high resolution (VHR) remotely-sensed multispectral Earth imagery. The system includes a data store comprising VHR remotely-sensed multispectral Earth image data in a file system, and a plurality of feature extraction modules, wherein each respective feature extraction module is operable to analyze the image data to generate feature data regarding the image data. The one or more feature extraction modules each access the file system using a common interface format to access the image data and store feature data.

A number of feature refinements and additional features are applicable to the second aspect. These feature refinements and additional features may be used individually or in any combination. As such, each of the foregoing features discussed in relation to the first aspect may be, but are not required to be, used with any other feature or combination of features of the second aspect.

A third aspect includes a method for generating feature data from image data using a plurality of hierarchical feature extraction modules. The method includes providing a plurality of feature extraction modules. Each respective feature extraction module is operable to generate corresponding feature data for image data, wherein the plurality of feature extraction modules comprises at least a first feature extraction modules operable to generate first feature data and a second feature extraction module operable to generate second feature data. The method may include first generating the first feature data with the first feature extraction module and communicating the first feature data to the second feature extraction module using a common interface format. In turn, the method may include second generating the second feature data at least in part based on the first feature data.

A number of feature refinements and additional features are applicable to the third aspect. These feature refinements and additional features may be used individually or in any combination. As such, each of the foregoing features discussed in relation to the first or second aspect may be, but are not required to be, used with any other feature or combination of features of the third aspect.

BRIEF DESCRIPTION OF THE FIGURES

The accompanying drawings illustrate several embodiments of the present disclosure and, together with the description, serve to explain the principles according to the embodiments. One skilled in the art will recognize that the particular embodiments illustrated in the drawings are merely exemplary, and are not intended to limit the scope of the present disclosure.

DETAILED DESCRIPTION

Figure 1:
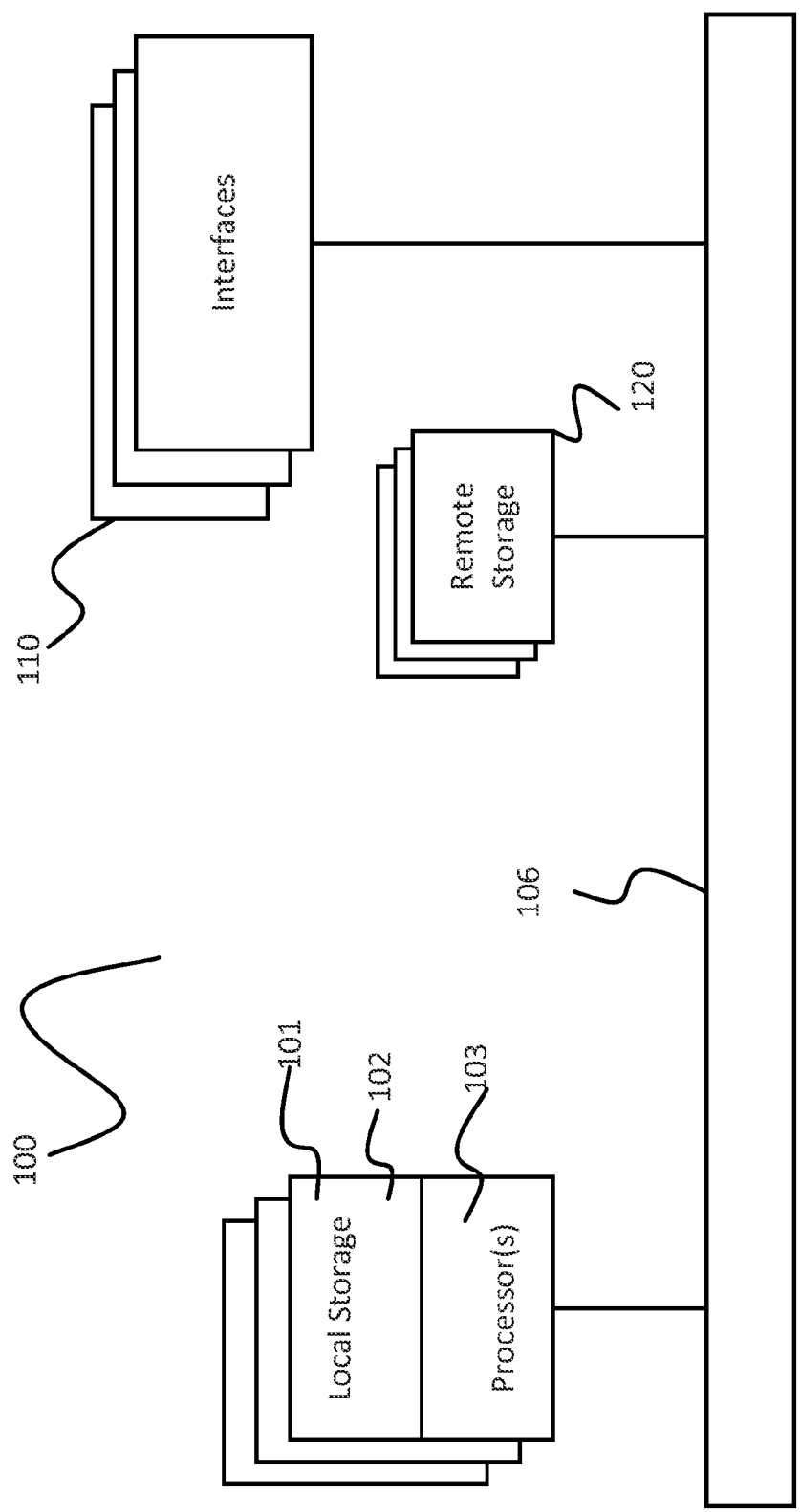
FIG. 1 is a block diagram illustrating an exemplary hardware architecture of a computing device used in an embodiment.

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Devices that are described as being in communication with each other need not be in continuous communication with each other, unless expressly specified otherwise. In addition, devices that are described as being in communication with each other may communicate directly or indirectly through one or more intermediaries, logical or physical. A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions.

Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article. The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

As used herein, a "feature" may correspond to an individual measurable heuristic property of a phenomenon being observed (e.g., a value related to image data). In this regard, features or feature data may be extracted from image data (e.g., by performing calculations and/or transformations of image data). As used herein, a "pixel-level feature" is a feature at a base level of classification. For example, pixel-level features may include textural properties, mathematical transforms applied to pixel data, a land-cover classification, or some other appropriate property description specific to individual pixels. As used herein, a "region-level feature" is a feature at a higher level of classification. For example, region-level feature observations may be related to morphology, i.e., may have shape properties (such as, area, perimeter, compactness, elongation, eccentricity, etc.), spatial relationships (such as, arrangement, distance, etc.), object classifications (for example, a school, paring lot, swimming pool, plane, shopping mall, etc.), and the like. As used herein, a "scene-level feature" is a feature that may aggregate statistics on lower level features (e.g., region-level features or pixel-level features), such as, percentage land cover (for example, 25% deciduous forest, 10% water, etc.), aggregate object counts (for example, 10 schools, 35 parking lots, etc.), other descriptive classifications (for example, desert, city, rainforest, etc.)

As used herein, a "graphics processing unit (GPU)" is a specialized electronic circuit known in the art that is designed to rapidly manipulate and alter memory to accelerate the creation of images in a frame buffer intended for output to a display or for other computational purposes. As used herein, a "Compute Unified Device Architecture (CUDA)" is a parallel computing platform and programming model known in the art created by NVIDIA™ and implemented by the graphics processing units (GPUs) that they produce that gives developers access to a virtual instruction set and memory of the parallel computational elements in CUDA GPUs.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network, a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine (JVM) or equivalent, or files containing higher level code that may be executed by the computer using an interpreter (for example, scripts written in Python, Perl, Ruby, Groovy, or any other scripting language).

Figure 2:
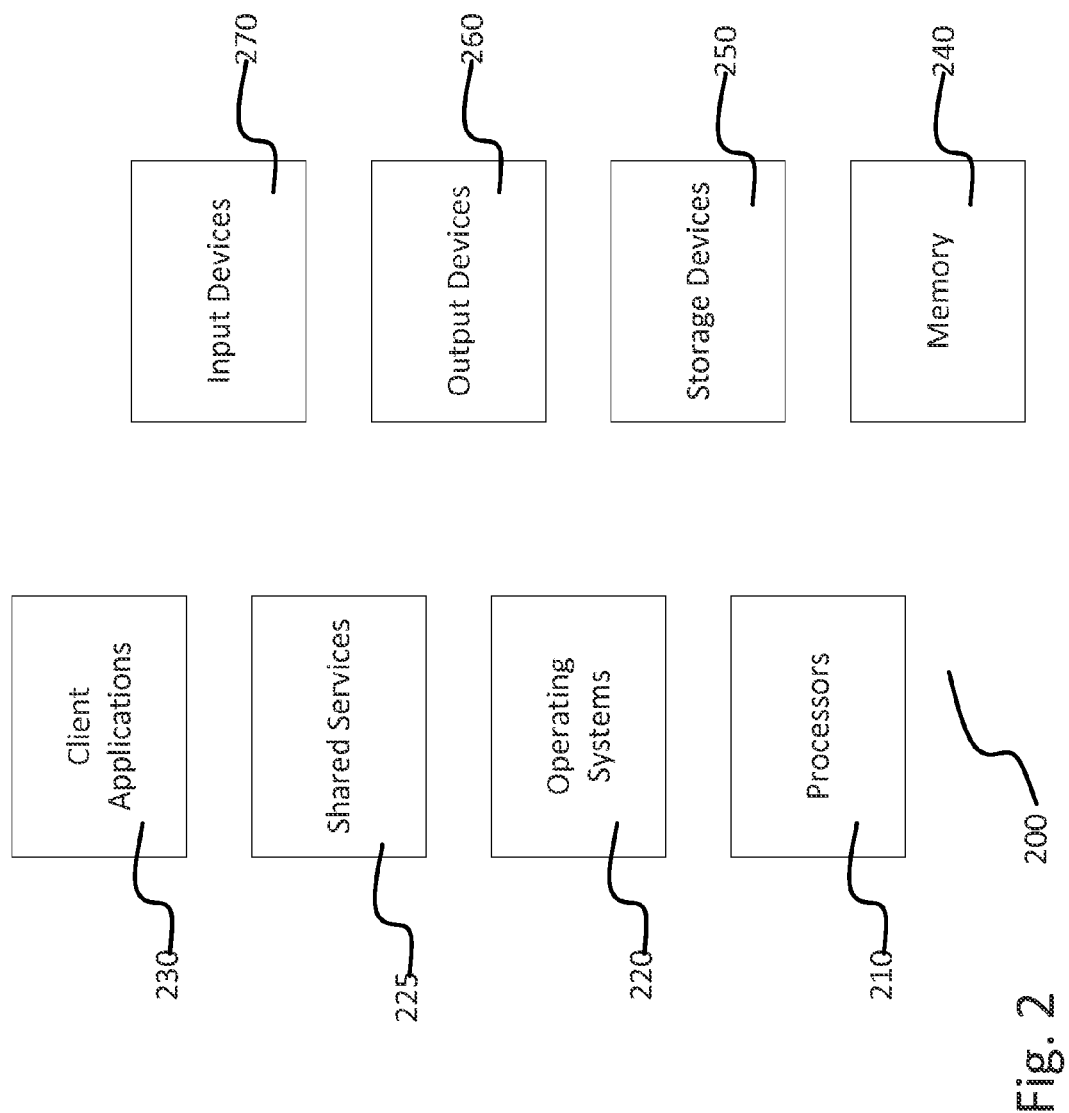
FIG. 2 is a block diagram illustrating an exemplary logical architecture for a client device, according to an embodiment.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
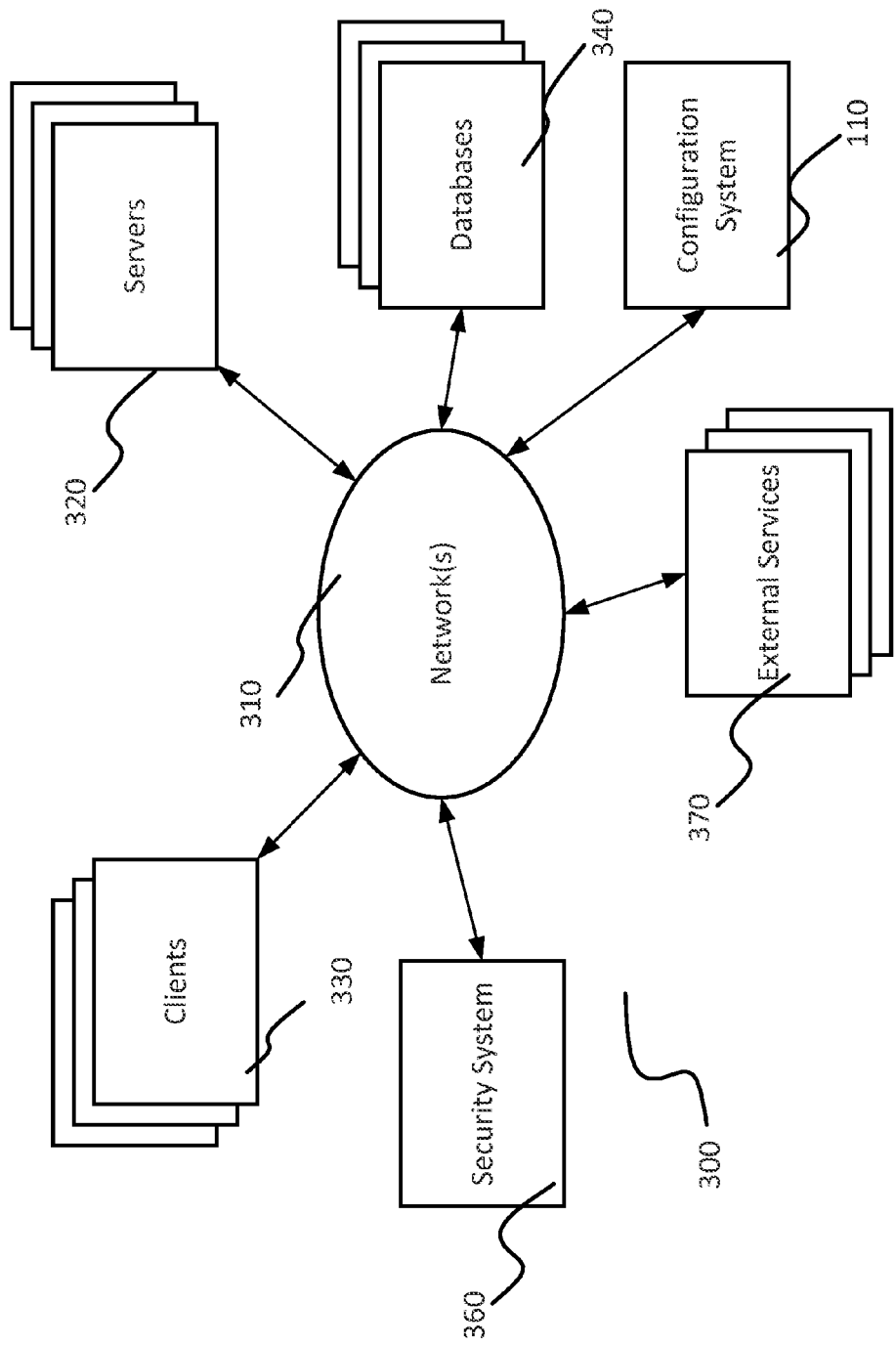
FIG. 3 is a block diagram showing an exemplary architectural arrangement of clients, servers, and external services, according to an embodiment.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Figure 4:
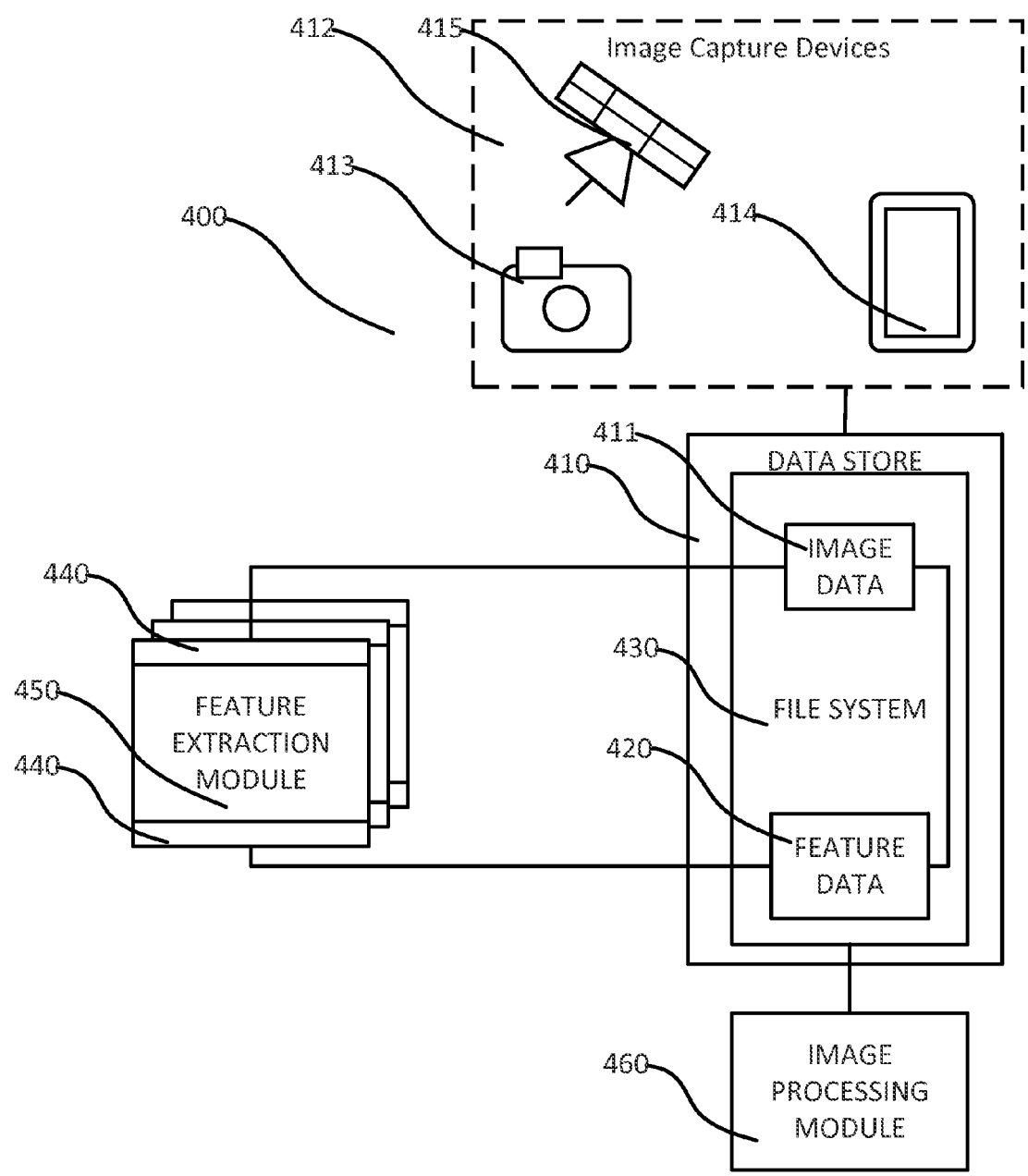
FIG. 4 is a schematic view of an embodiment of a feature extraction system.

FIG. 4 is a block diagram illustrating an exemplary feature extraction system 400 that may be used for a variety of applications where extracted feature data from image data may assist in image analysis including, for example, modular image mining and search, land classification, object detection, change detection, or any other application in which extracted features of image data may be useful. As illustrated, system 400 may comprise a plurality of software or hardware elements that may be variably interconnected, and it should be appreciated that such components may be variable in implementation; that is, components may be software-based and stored and operating on separate or joined hardware systems interchangeably (for example by running multiple software systems on a single computer server), or may be physically-distinct hardware such as dedicated computing hardware for specific elements as illustrated. It should be further appreciated that connections between components as illustrated may be direct physical connections (such as via cables or internal software connectivity within a hardware system operating multiple components as described above) or they may be remote data connections such as communication over the Internet or another communications network. In this manner, it should be appreciated that the constructions and arrangement illustrated is exemplary, and a variety of arrangements may be possible, and it should be further appreciated that the quantity and arrangement of components is exemplary and alternate or additional components may be utilized. In this manner it can be appreciated that the nature of the system 400 is flexible and scalable, i.e. it may be arranged as suitable for varying particular implementations as may be appropriate (such as a small-scale implementation utilizing software elements operating within a personal computer for individual use, or a large-scale implementation utilizing separate computer servers for operation utilizing greater computing power or storage space, as may be desirable for an enterprise or cloud-based service).

As illustrated, image data 411 may be stored in a data store 410 or similar data storage (e.g., a database or the like). Image data 411 may be of variable nature such as simple stored images or more detailed information or "metadata" stored along with images such as image tags or other identifying data (such as, as is common in the art, data pertaining to when, where, or how an image was captured, such as might be recorded by an image capture device 412 when taking a snapshot). Furthermore, image data 411 need not be an existing cache of stored data, and could be a quantity of "live" data being accessed by system 400 for operation such as capturing images via any appropriate image-capture devices 412 connected to system 400 such as cameras 413, image capture-capable electronic devices such as tablet computing devices or smartphones 414, or aerial or satellite imaging systems 415, in order that captured images may be indexed directly without first being stored.

It should be appreciated that the use of a database as the data store 410 is exemplary, and that image storage may be accomplished via a variety of means common in the art, such as a single physical storage medium (such as magnetic, optical, solid-state, or other storage devices common in the art), or a distributed storage system (such as a distributed file storage system as may be utilized in computing clusters), and further that such storage may be local (i.e., stored and operating alongside other components of system 400 such as a server's hard disk drive or a connected storage system) or remote (such as a remotely-connected and accessible storage device or a cloud-based storage service), and that connection may be accomplished via either physical or remote means, as described previously. In this manner it should be appreciated that image storage is highly variable, further enabling a flexible and scalable design that may be readily adapted to a variety of storage means as may be appropriate, without necessitating the manipulation of existing data.

The image data 411 may undergo analysis by one or more feature extraction modules 450 shown in FIG. 4. In this regard, feature extraction modules 450 may be operable to access the image data 411 and analyze the image data 411 to generate feature data 420. For example, feature data 420 to be extracted from the images may comprise "pixel-level" features where individual pixels within an image may be scanned and identified such as to determine textural information (such as may be appropriate in determining whether a photographed object is made of metal or wood, or for determining terrain in a satellite image of an area). In this regard, pixel-level feature extractors may include spectral analysis performed relative to pixels, mathematical transforms of spectral data concerning pixels, or other processing on a pixel-level. In turn, it may be appreciated that pixel-level features may also be useful in feature extraction modules for determining "segmentation" of image elements (such as identifying the separation of individual objects, like separating buildings in a photograph of a skyline or the edge of a forest in a satellite image).

In a further "region-level" feature extraction operation, an image may be processed for mid-level granular information, optionally using pixel-level information from a previous feature extraction operation. For example, using previously extracted segmentation information, a region-level indexing operation might identify the nature of objects or regions identified previously (continuing from the previous example, identifying that one region of a satellite image is a forest while another is an urban sprawl, detecting objects from an image such as cars, parking lots, buildings, or the like). In this regard and as will be described in greater detail below, feature extraction modules 450 may be at least partially hierarchical such that a feature extraction module 450 may generate feature data 420 based on other feature data 420 generated from another feature extraction module 450.

In a further "scene-level" feature extraction operation, an image may be processed for the highest level of granular information, such as (again, continuing previous examples) analyzing what percentage of a satellite image is forested, or counting the number of objects in an image.

Figure 5:
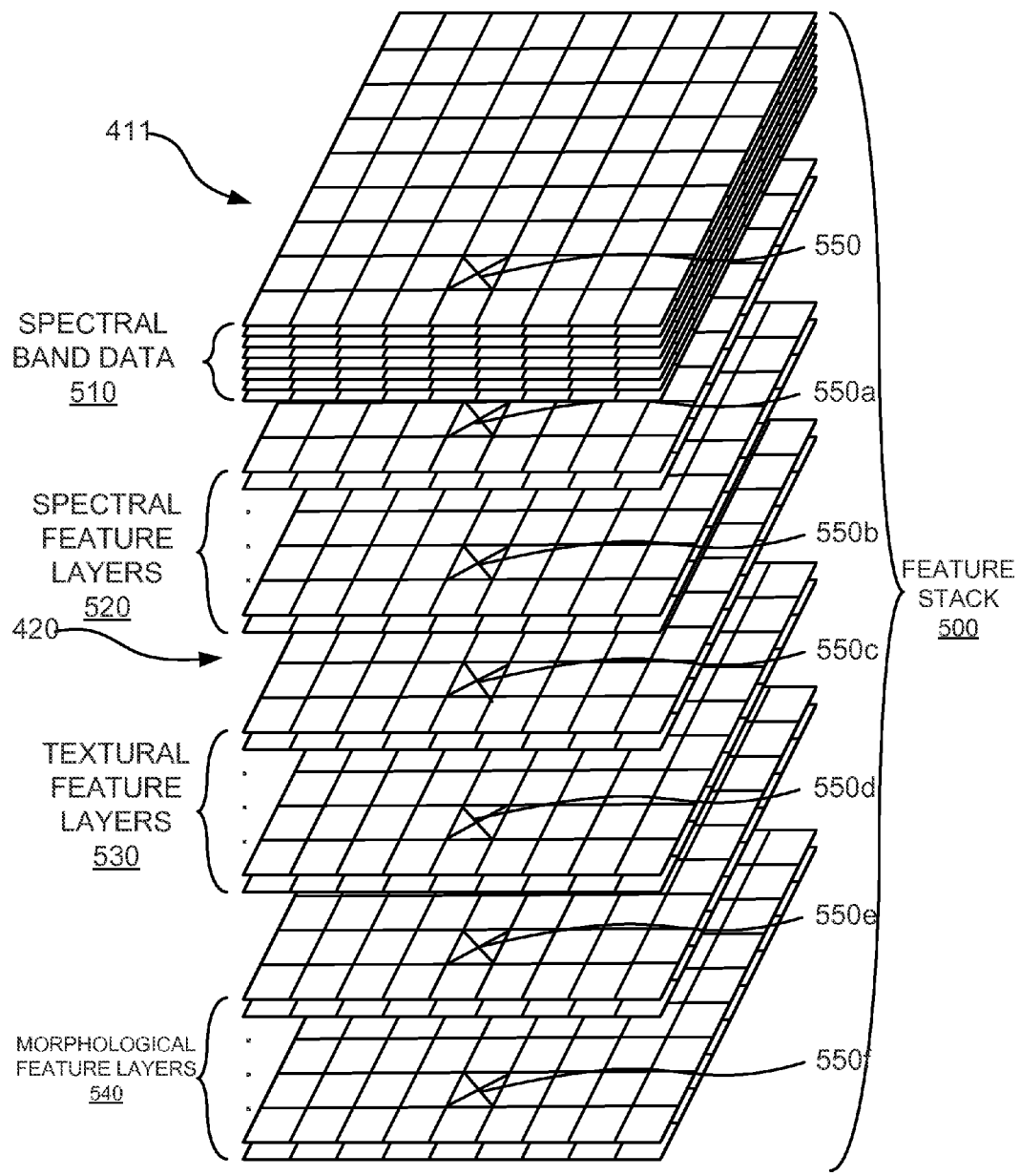
FIG. 5 is a graphical representation of an embodiment of a feature stack of feature data that may be generated for corresponding image data using an embodiment of a feature extraction system.

In this regard, the extracted feature data 420 may be provided as a feature stack 500, graphically illustrated in FIG. 5. With further reference to FIG. 5, it may be appreciated that for each portion of image data 411, a plurality of layers of information or feature data 420 related to or comprising subcomponents of the image data 411 may be provided in the form of a feature stack 500. In this regard, the feature stack 500 may include image data 411 (e.g., spectral band data 610 for each pixel) and one or more layers generated by way of a feature extraction module 450. For instance, the spectral band data 510 may include pixel value (e.g., a gray level value for each pixel for each spectral band provided). In this regard, as shown in FIG. 5, eight spectral bands are provided corresponding to, for example, spectral data collected from the eight spectral detectors of the WorldView 2 satellite imaging system 415 operated by DigitalGlobe, Inc. However, additional or fewer numbers of spectral bands may be provided in the spectral band data 510. The image data 411 may be orthorectified and/or atmospherically compensated satellite imagery. Other image processing common to remotely-sensed imagery may also be provided without limitation. In this regard, feature data 420 may be more portable as the image data 411 may be atmospherically compensated, thus providing more consistency between image data 411 for different geographies or atmospheric conditions.

In any regard, a visible image may be generated that may include components from one or more of the layers of the feature stack 500. For instance, in one embodiment, data from the spectral band data 510 corresponding to wavelengths visible to the human eye, such as for example, the red, green, and blue bands may be combined to produce an image representative of the image as visible to the human eye (e.g., a natural color image). This layer may be stored as a spectral feature layer 520 as it may comprise a function (i.e., an extracted feature) that is based on one or more of the spectral band data 510. Furthermore, visible images may be generated based on gray level values from spectral band data 510 not visible to the human eye to generate visible representations of such bands (e.g., alone or in combination with other human visible and/or nonhuman visible bands) to generate false color images. In this regard, the spectral feature layers 520 of the feature stack 500 may include, for example, layers that include data based on spectral band data 510 of the image data 411 including, for example, combinations thereof.

Accordingly, the extraction of a limited number of bands (e.g., the red, green and blue bands or "RGB" bands to construct an RGB natural color image) may allow for reduced computational overhead when presenting the image data to the user. That is, rather than loading and/or attempting to display all values of all bands available for an image, the RGB bands may be used to present an image that represents the human-visible portion of the spectrum. Accordingly, where the user views or manipulates the image the use of the RGB image may be more efficiently loaded and/or manipulated with less computational overhead.

The spectral feature layers 520 may also include ratios of gray values for one or more bands for each pixel based on the spectral band data 510. For example, in one ratio of spectral bands that may be generated as a layer includes:

$$\frac{(\text{Band } A_i - \text{Band } B_i)}{(\text{Band } A_i + \text{Band } B_i)} \qquad \text{Equation 1}$$

where Band $A_i$ represents a pixel value from a first spectral band in the spectral band data 510 for a given pixel i, and Band $B_i$ represents a pixel value from a second spectral band in the spectral band data 510 for the given pixel i.

The feature extraction modules 450 may also be operable to generate data layers that include feature data 420 for a given portion of image data 411. For example, textural feature layers 530 and/or morphological feature layers 540 may also be generated for a portion of image data 411 that form a portion of the feature stack 500 as will be described in greater detail below.

In any regard, it may be appreciated that the layers in the feature stack 500 may each include corresponding pixel feature data for a pixel from the image data 411. For example, in FIG. 5, the image data 411 may include a nine pixel by nine pixel portion of image data 411. A highlighted pixel 550 has been denoted with an "x." Values for pixels 550a-550f are also provided in various feature data layers that correspond to pixel 550 and also denoted in the feature data layers of the feature stack 500. These additional corresponding pixels 550a-550f are each provided in a corresponding position in a respective feature data layer to pixel 550. That is, for each feature data layer, a corresponding nine by nine pixel map may be provided with values corresponding to the feature data for each one of the pixels of the image data 411. It may be appreciated that the resulting feature data layer generated by a feature extraction module 450 may, but need not, correspond to the size of the portion of image data 411 used to generate the layer. That is, the resulting data layer may be a larger or smaller array than the image data 411. Furthermore, each pixel in a feature data layer may be a vector value or other type of output corresponding to a portion of the image data 411. However, in the example depicted in FIG. 5, for example, pixels 550a and 550b may include values corresponding to spectral features extracted from pixel 550 (e.g., from one or more of the spectral band data 510 corresponding to pixel value 550). Pixels 550c and 550d may include values corresponding to textural features extracted based on a feature extraction operation carried out relative to pixel 550. Pixels 550e and 550f may include values corresponding to morphological features extracted based on a feature extraction operation carried out relative to pixel 550. In any regard, it may be appreciated that for a given pixel 550, corresponding feature values (i.e., pixels 550a-550f) may be provided that correspond to the pixel 550. As such, the values for pixels 550a-550f may be associated with pixel 550 such that the values for each of the pixels may be associated.

It may further be appreciated that in the case of VHR remotely-sensed multispectral Earth imagery, each pixel 550 may be correlated to a corresponding geographic position. As such, for each pixel 550, a geographic identifier may be provided that is indicative of the geographic location corresponding to a given pixel 550.

Textural feature layers 530 may be generated using feature extraction modules 450 including, for example, Gabor filter feature data, histogram of oriented gradients (HOG) features, or any appropriate other textural features. Morphological feature layers 540 may be generated using feature extraction modules 450 including, for example, identification of human buildup or the like (e.g., as discussed in U.S. patent application Ser. No. 14/013,904 entitled AUTOMATIC EXTRACTION OF BUILT-UP FOOTPRINTS FROM HIGH RESOLUTION OVERHEAD IMAGERY THROUGH MANIPULATION OF ALPHATREE DATA STRUCTURES filed on Aug. 29, 2013, the entirety of which is incorporated by reference). As may be appreciated from FIG. 5, there may be any number of spectral feature layers 520, textural feature layers 530, and/or morphological feature layers 540 provided in the feature stack 500.

Specifically, the present disclosure may facilitate feature extraction of features from one image data, wherein the feature extraction system 400 is autonomous and/or highly scalable. For example, in the specific context of feature extraction from very high resolution (VHR) remotely-sensed multispectral Earth imagery, the number of features that may be generated from such imagery may be numerous. Furthermore, feature extraction modules 450 may be operable to build upon previously extracted feature data 420 or such that sequential execution of a plurality of feature extraction modules 450 is carried out to generate feature data 420. In this regard, the environment in which such feature extraction modules 450 are provided may be advantageously structured to allow for independent development of feature extraction modules 450 wherein the feature extraction modules 450 are easily inter-operable with one another and a file system 430 used for storing the image data 411 and feature data 420.

Accordingly, the feature extraction system 400 may be provided that facilitates an autonomous, modular, and decoupled approach to a feature extraction operation to be performed on imagery. In FIG. 4, a file system 430 may be provided that may be used to store image data 411 therein.

The image data 411 and/or feature data 420 may be accessible by the one or more feature extraction modules 450. Each one of the plurality of feature extraction modules 450 may be operable to extract from the image data 411 or previously generated feature data 420 one or more portions of feature data 420 for which the module 450 is specifically adapted. Examples of feature extraction modules 450 are provided in greater detail below.

In any regard, each feature extraction module 450 may be operable to generate feature data 420. The feature data 420 (e.g., a data layer of a feature stack 500) may be provided from the feature extraction module 450 and stored using the file system 430 of the data store 410. In this regard, feature data 420 that is extracted from the image data 411 may be stored in the file system 430 in corresponding relation to the image data 411 from which the feature data 420 was generated. The correspondence may be provided as a correlation between pixels of the image data 411 and a corresponding value in a data layer of the feature stack 500 (e.g., as described above in relation to the feature stack 500) or, in the case of geospatial imagery, as a correlation between geospatial values (e.g., latitude and longitude values or the like).

As described above, given the potential for many types of features to be of interest, many different feature extraction modules 450 may be provided that each correspond to different feature data 420 to be extracted from the image data 411. Given the potential variety and potentially differing objectives of the feature extraction modules 450, a modular, decoupled approach to the architecture and use of feature extraction modules 450 in the feature extraction system 400 used may be preferred to facilitate the wide variety of feature data that may be generated by differing feature extraction modules 450. As such, each feature extraction module 450 may be in communication with the file system 430 by way of a common interface format 440. In this regard, the common interface format 440 may provide a predefined format for communication between the feature extraction modules 450 and the file system 430 for both retrieval of image data 411 and communication of feature data 420.

In this regard, the feature extraction modules 450 may be independently developed and/or executed. That is, the feature extraction modules 450 may be built with differing architecture, programming languages, and/or programming paradigms such that the design of the feature extraction modules 450 may vary. However, given the use of a predetermined interface format 440, intercommunication between the feature extraction modules 450 and the file system 420 may be facilitated regardless of the nature of the feature extraction module 450. Accordingly, feature extraction modules 450 may be independent and modular with communication facilitated by way of the common interface format 440. Thus, the feature extraction system 400 may be highly adaptable and scalable. For instance, feature extraction modules 450 may be independently developed, yet retain interoperability though the common interface format 440. In this regard and as stated above, feature extraction modules 450 may comprise different programming languages or the like. Furthermore, as each feature extraction module 450 may utilize the predetermined interface format 440 for input and output communications, exchange of data between feature extraction modules 450 may also be according to the common interface format 440. In this regard, inter-module communications may be facilitated so as to allow for sequential execution of a plurality of feature extraction modules 450 as will be described in greater detail below. Accordingly, in addition to accessing image data 411, a feature extraction module 450 may also be operable to access feature data 420 from other feature extraction modules 450 by way of the common interface format 440.

Figure 9:
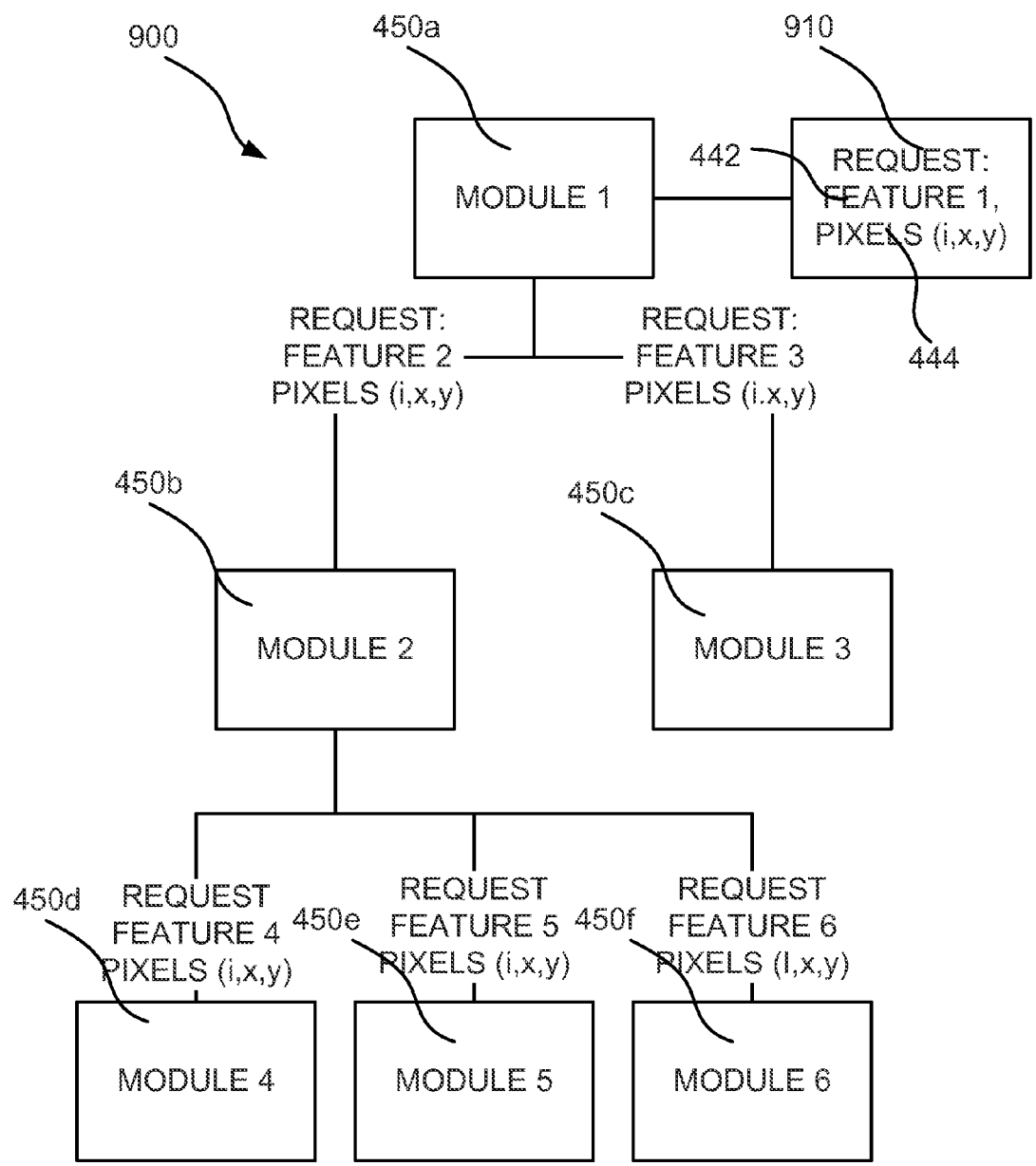
FIG. 9 depicts an embodiment of interaction between various feature extraction modules by way of a common interface format.

With further reference to FIG. 9, one embodiment of a structure 900 for interaction of feature extraction modules 450 is shown. As may be appreciated, use of a common interface format 440 may allow for a more efficient and user friendly approach to facilitating generation of feature data 420 by way of feature extraction modules 450. For instance, as shown in FIG. 9, a request 910 for a particular feature (e.g., Feature 1) corresponding to a particular portion of an image may be provided. In this regard, the common interface format 440 may include a feature identifier 442 and an image identifier 444. Accordingly, as may be appreciated, feature data 420 generated by a given module may be identified by a corresponding feature identifier 442. As such, using the example shown in FIG. 9, request 910 may include a feature identifier 442 corresponding with "Feature 1" produced by feature extraction module 1 450*a*. As such, the request 910 may be formatted according to the common interface format 440 such that the feature identifier 442 may be used to identify which module 450 should be called for execution from a plurality of modules 450 that may be provided with the system 400.

Additionally, the request 910 may include an image identifier 444. As shown, the image identifier 444 may be provided in the common interface format 440. Specifically, the image identifier 444 may be a function of a given image i and particular pixel ranges within the image i such as for example a horizontal range denoted in FIG. 9 as x and a vertical range denoted as y. It will be appreciated that x and/or y may be a range of pixels to define a region within image i for which the feature data 420 is requested. In this regard, upon provision of the feature identifier 422 and image identifier 444 in the common interface format 440, the system 400 may address the request 910 to the appropriate module 450 to solicit feature data 420 corresponding to the requested feature from the identified portion of the layer.

Furthermore, as described above, in at least some instances, generation of feature data 420 by a module 450 may be based on one or more other portions of feature data 420 that may be generated by other modules 450. For instance, as illustrated in FIG. 9, a hierarchical model where modules 450 operate based on feature data 420 from other modules 450 is shown. For instance, module 1 450*a* may rely on Feature 2 and Feature 3 in determining Feature 1. As such, module 1 450*a* may call module 2 450*b* to retrieve feature data 420 corresponding to Feature 2 and may call module 3 450*c* to retrieve feature data 420 corresponding to Feature 3. It may be appreciated that a module 450 may obtain feature data 420 from file system 430 and/or another module 450. Module 1 405*a* may utilize the common interchange format 440 by providing a feature identifier 442 for Feature 2 and Feature 3 to the respective modules 450*b* and 450*c* along with an image identifier 444 that corresponds with the image data for which the respective feature data 420 is to be provided. Furthermore, it may be appreciated that multiple levels of such dependency may exist such that, for example, determination of Feature 2 by module 2 450*b* requires feature data 420 corresponding to Feature 4, Feature 5, and Feature 6 to be provided by module 4 450*d*, module 5 450*e*, and module 6 450*f*, respectively. In this regard, it may be appreciated that module 2 450*b* may similarly utilize the common interface format 440 to retrieve the appropriate feature data 420 from modules 450*d*-450*f* as shown in FIG. 9.

Accordingly, by use of the common interface format 440, integration of modules 450 into the system 400 and intercommunication between modules 450 may be improved. For example, rather than having to encode instructions for each portion of feature data 420 to be received, upon a request for feature data 420, the use of the common interface format 440 may allow for modular and scalable construction using one or more feature extraction modules 450. For instance, in the example provided in FIG. 9, absent use of the common interface format 440 for communications between modules 450, upon the need for feature data 420 corresponding to Feature 1, a user may be required to recognize the need for computation of Features 2-6 by modules 450*b*-450*f* and encode instructions corresponding to each modules in addition to the request for Feature 1 from module 450*a*. This may become particularly burdensome in the case where modules 450 are generated using different programming languages, programming paradigms, or the like. However, with use of the common interface format 440, each module may be constructed such that it may autonomously handle external calls for other feature data 420 needed, thus avoiding the need to encode instructions for each operation involved in generation of feature data 420. Rather, upon creation of a module 450, regardless of the manner in which the module 450 is executed (e.g., which programming language, programming paradigm, method of execution, etc.), the module 450 may be integrated into the system 400 as all requests to the module 450 and responses from the module 450 may be provided in the common interface format 440 including feature identifier 442 and image identifier 444 such that intercommunication with the module 450 by other modules 450 or between the module 450 and the file system 410 may be standardized.

Furthermore, it may be appreciated that some feature data 420 may be determined on demand, while other feature data 420 may be predetermined, i.e., prior to the feature data 420 actually being requested. For instance, certain feature data 420 may be determined only upon request (e.g., by a user or another module 450). Other feature data 420 may be automatically generated on some occurrence (e.g., receipt of new image data 411) and the feature data 420 may be stored for later retrieval. For instance, computationally taxing feature data 420 may be pregenerated such that upon request for the feature data 420 (e.g. by a user or other feature module 420), the feature data 420 may be more quickly retrieved and provided (e.g. from the file system 420). However, in other examples, computationally taxing feature data 420 may be only calculated on demand to reduce the computational overhead used. That is, only feature data 420 that is actually requested may be calculated. As may be appreciated, which feature data 420 is predetermined or determined on demand may be selected by a user of a system or may be provided in a default state that is changeable by a user.

In any regard, continuing the example shown in FIG. 9, upon receipt of the request 910, module 1 450*a* may distribute an initialization command to all feature extraction modules 450 that module 1 450*a* depends (i.e., modules 450*b*-450*f* in FIG. 9). In this regard, rather than, for example, sequentially calling each feature module 450 when needed, module 1 450*a* may initialize each other feature extraction module 450*b*-450*f* such that those modules may, in parallel, begin to determine or retrieve the feature data 420 relied upon by module 1 450*a*. That is, if feature data 420 for a module 450 is determined on demand, a module 450 may begin determining the feature data 420 to be provided to module 1 450*a*. Additionally or alternatively, if feature data 420 for a module 450 is predetermined, the module 450 may access such predetermined feature data 450 for the portion of the image for which the feature data 420 is requested and provide such feature data 420 to module 1 450a. In this regard, it may be appreciated that the initialization request may comprise the common interface format 440 including a feature identifier 442 and an image identifier 444.

One example of a feature extraction module 450 that may execute in the feature extraction system 400 described above is a fractal dimension feature extraction module. The term "fractal dimension" effectively defines the extent to which a lower dimensional function (e.g., a one dimensional line, two dimensional plane, etc.) effectively occupies a space of a higher dimension (e.g., two dimensional space in the case of the one dimension line or three dimensional space in the case of the two dimensional plane). That is, the fractal dimension may provide a measure of the complexity of a function of a given dimension. As an example, two one dimensional lines defined as $$y = \sin\left(\frac{10}{x}\right) \text{ and } y = x,$$

respectively, may have differing fractal dimensions for an interval of $-0.2 \leq x \leq 0.2$. That is, the function $$y = \sin\left(\frac{10}{x}\right)$$

may have a higher fractal dimension over the interval than the function y=x as the sine function may occupy much more of the space in the interval although both functions have a topological dimension of one.

Accordingly, for an image, the gray level values for a given spectral band may be considered as describing a convoluted, two-dimensional surface, the fractal dimension of which may provide information about the "roughness" of the two-dimensional surface defined by the gray level values. That is, the image may be conceptualized as a three dimensional surface whose height from the normal at each pixel is represented by a gray value of the pixel. In this regard, the fractal dimension feature extraction module may be operable to extract feature information in relation to the fractal dimension of one or more portions of an image that may provide useful information regarding the nature of the image. The fractal dimension for a given portion of an image may be determined using any appropriate method for calculation of a fractal dimension.

Figure 6:
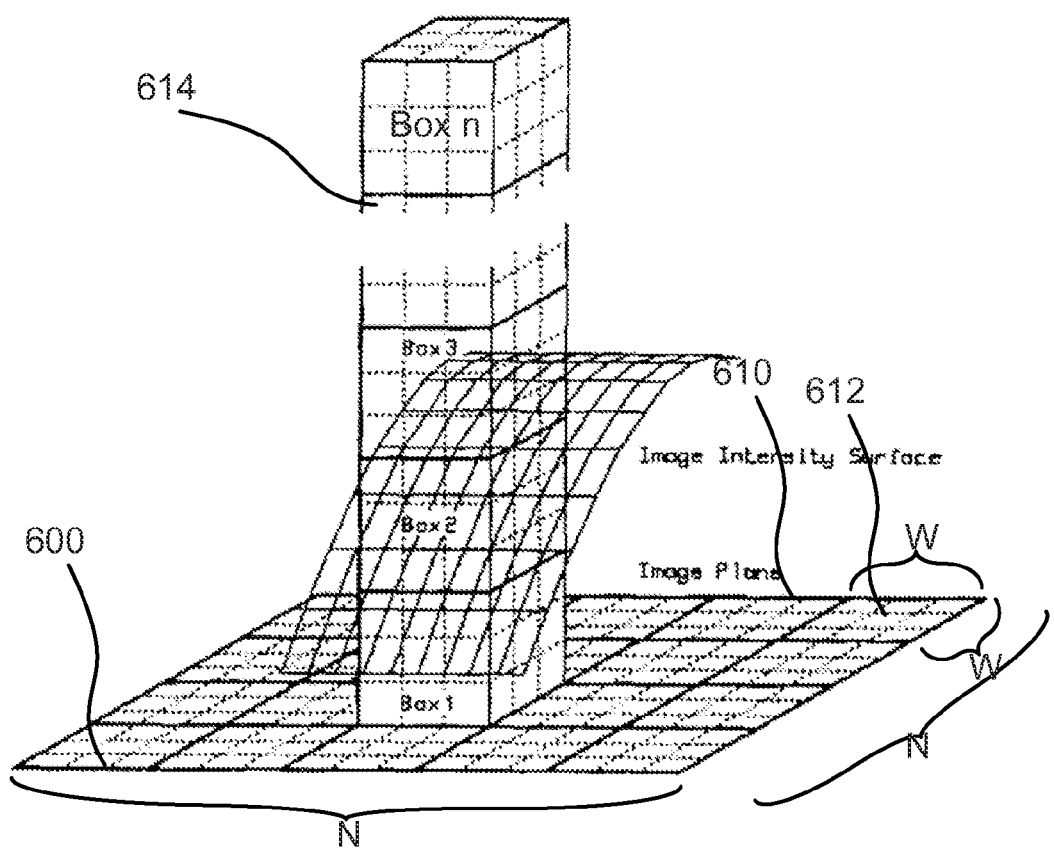
FIG. 6 depicts an embodiment of a graphical representation of a method for determining a fractal dimension of an image.

In one particular embodiment of a fractal dimension feature extraction module conceptually illustrated in FIG. 6, an image 600 may be divided into a plurality of subdivisions 610 of a predetermined size of pixels. This predetermined size of the subdivision 610 of the image 600 may be defined as N×N pixels. As may be appreciated, the subdivision of the image may be provided in accordance with a tiling scheme applied to geospatial images such as tiling schemes commonly used in mapping applications such as, for example, the Google Maps Tiling Scheme, described in the Google Maps API document available from Google, Inc., Mountain View, Calif., the Bing Maps Tiling Scheme, described in the Bing Maps Tile System available from Microsoft Corporation, Redmond, Wash., or a custom tiling scheme that may, for example, be a geographic based projection. For each predetermined image of size N×N, the image may be divided into a plurality of abutting windows 612 within the N×N image of size W×W pixels, where W is an integer that complies with the inequalities $$W \leq \frac{N}{2} \text{ and } W \geq 3$$

and represents a side dimension of the abutting window 612.

As such, for each window 612 of size W×W, a column of boxes 614 having a volume of W×W×W' may be constructed. In this regard, W' may be considered the height of the column 614. The height may be represented in increments of the side dimension of the abutting window (W). In this regard, the height may be determined such that the ratio of the predetermined size of the image (N) to the side dimension of the abutting windows (W) equals the ratio of the maximum pixel gray value for a given multispectral band of the image to the height of the column 614. That is, where D is the gray level range for the image, the height of the column 614 may be determined with the equation $$\frac{N}{W} = \frac{D}{W'}.$$

As such, a column of W×W×W' is created for each abutting window in the image.

In this regard, for each abutting window 612 of size W×W, the minimum and maximum gray value for each pixel is located within a specific one of the boxes defined in the W×W×W' sized column 614. The boxes of size W×W×W' may be numbered with successive integers in ascending order extending away from the base of the column (e.g., as shown in FIG. 6 as Box 1, Box 2, Box 3 . . . Box n). Once the minimum and maximum gray value has been located, the distance separating the minimum and maximum values may be computed as n=h−l+1 where h and l are the numbers of boxes with the highest and lowest values, respectively, over the W×W×W' sized box. This process is repeated for each abutting window 612 of size W×W to determine a column height W' and a n value for each. The total number of boxes to cover the whole image subdivision 610 of size N×N may be calculated as:

$$N_W = \sum_{i,j} n \qquad \text{Equation 2}$$

This process is further repeated for all values of W that satisfy the above noted inequalities related to the size of W. In turn, a log-log plot of values of $N_w$ versus W may be generated and the negative slope of the least squares line of the plot may define the fractal dimension. In turn, each subdivision 610 of the image 600 may undergo this process to determine the fractal dimension of each subdivision 610. In turn, a fractal map may be generated that is an aggregation of information from each unique N×N subdivision 610 of the original image 600. Such information may provide relatively dense textural information per pixel.

Another feature extraction module 450 that may be provided may include a total variational feature extraction module. In VHR multispectral remotely-sensed Earth imagery, a plurality of spectral bands may be collected. That is, the image sensor used to collect image data may have a plurality of specifically designed sensor portions capable of detecting light at a predetermined wavelength. For instance, WorldView 2 operated by DigitalGlobe, Inc. collects data in 8 spectral bands including, for example, costal (400-450 nm), blue (450-510 nm), green (510-580 nm), yellow (585-625 nm), red (630-690 nm), red edge (705-745 nm), near-infrared 1 (770-895 nm), and near-infrared 2 (860-1040 nm). There may also be a panchromatic sensor capable of detecting black and white imagery in a broad wavelength band (e.g., the wavelength band of 450-800 nm). Further still, in at least some embodiments, one or more bands in the short-wavelength infrared range (SWIR) may be provided. For example, one or more SWIR bands may be provided including, for example, SWIR 1 (1195-1225 nm), SWIR 2 (1550-1590 nm), SWIR 3 (1640-1680 nm), SWIR 4 (1710-1750 nm), SWIR 5 (2145-2185 nm), SWIR 6 (2185-2225 nm), SWIR 7 (2235-2285 nm), and/or SWIR 8 (2295-2365 nm). Other combinations and/or ranges of SWIR bands generally from about 1195 nm to about 2400 nm may be provided in any combination. For any of the foregoing bands discussed, band definitions may be broader and/or narrower than those described above may be provided without limitation. In any regard, there may be a plurality of band values corresponding to gray level values (e.g., digital numbers) for each band for each given pixel in a portion of multispectral image data as each band may be representative of the intensity of the surface reflection in a given subset of the total spectrum.

In any regard, there may be a plurality of band values (e.g., spectral band data 510 shown in FIG. 5) corresponding to gray level values for each band for each given pixel in the multispectral image data 411. Traditionally, feature sets have utilized combinations of gray level values for each spectral band and/or normalized difference ratios as a feature set for analysis, such as the approach described above relating to spectral band ratios. However, it may be appreciated that these values may be corrupted by, for example, sensor noise or local texture on a given surface type. Accordingly, prior approaches have been proposed that filter gray level values over a small spatial window by, for example, taking the mean or median gray level value for a group of pixels in the spatial window. However, while this type of filtering may reduce noise, the filtering may blur information across discontinuities, which, for example, may obscure edge detection or other techniques to be applied to the image. Furthermore, nonlinear median and morphological filters typically operate on a per band basis, where the filter is independently applied to each of the plurality of spectral bands of an image. This becomes less effective for images having a plurality of bands.

In turn, the total variational feature extraction module may operate on a plurality of spectral bands of an image (e.g., all 8 spectral bands of 8 band image data 411) simultaneously to perform a variational simplification across the multiple bands of the image. Accordingly, the output of the total variational feature extraction module is a data layer comprising a filtered set of image bands (i.e., a filtered image) that may be utilized in further image processing (e.g., utilizing the filtered gray level values or normalized ratios therefrom).

The total variational feature extraction module may be a global optimization that all image pixels from a plurality of spectral bands are optimized jointly using the formula:

$$f(u) = \tau_i |u_i - x_i| + \lambda |\text{grad}(u_i)|$$ Equation 3 where i represents a multivalued vector at a pixel, u is the filtered image stack (row, column, band), and x is the input image. The L1 vector norm of a given function g(x) is represented by the value |g(x)| in the above equation, where the L1 vector norm is defined by the equation:

$$|g(x)| = \sqrt{\sum_{i=1}^{n} x_i^2}$$ Equation 4

The function grad( ) represents a vector-valued spatial gradient defined as:

$$|\text{grad}(u_i)| = \sqrt{|\text{grad}x(u_i)|^2 + |\text{grad}y(u_i)^2|}$$ Equation 5 where gradx( ) and grady( ) represent the spatial gradient in the image x and y directions, respectively. In this regard, Equation 3 may be optimized to determine a global minimum for the image over a plurality of bands. As such, the best filtered image u is found when Equation 3 is globally minimized over the entire image including all spectral bands. In this regard, it may be appreciated that the first term of Equation 3 may penalize the filtered image as the filtered image differs from the original image. The second term of Equation 3 attempts to regularize the filtered image u such that the resulting image values of u are spatially homogenous. To this end, it may be appreciated that as the L1 norm is utilized (e.g., in contrast to the L2 norm), in the first term, an occasional large discrepancy or outlier may be tolerated in the minimization. Similarly, the use of the L1 norm in the second term allows for abrupt edge discontinuities in the second term. Additionally, in the second term λ represents a smoothing factor that allows for tuning of the desired smoothness in the resulting filtered image u.

In this regard, Equation 3 may be optimized to determine the resulting global minimum for the function f(u). The solution may be obtained using any optimization approach, however, it has been found that in a preferred embodiment, a Split Bregman technique may be employed. Additionally, Gauss-Seidel updates may be performed. A discussion of the Split Bregman technique is disclosed in Goldstein, Tom and Osher, Stanley, *The Split Breqman Method for L1 Regularized Problems*, available at ftp://ftp.math.ucla.edu/pub/cam-report/cam08-29.pdf, the entirety of which is incorporated by reference herein. It has been found that this approach to the optimization is quite fast and maps well to execution on a GPU (e.g., a CUDA processor) due to the highly parallel nature of the algorithm.

Another feature extraction module 450 that may be provided is a rotational invariant histogram of gradients module. In this regard, one skilled in the art will recognize that histograms of oriented gradients (HOGs) is an established technique for computing and histogramming gradients in images based on the orientation and magnitudes of the gradients over some window. For example, Dalal, Navneet and Triggs, Bill, *Histograms of Oriented Gradients for Human Detection*, International Conference on Computer Vision and Pattern Recognition, (2005), discusses one such approach and is incorporated by reference in its entirety.

However, previous approaches to HOGs relied on underlying assumptions regarding the orientation of objects to be identified using HOGs. For instance, prior work may have assumed that human figures would generally appear vertically in a standing position. However, in the case of VHR multispectral remotely-sensed Earth imagery, such assumptions based on suspected orientations may be of very little to no value as the orientation of objects in such imagery may be provided over a plurality of orientations or at random. As such, a rotationally invariant approach to HOGs is proposed and discussed herein.

Figure 7:
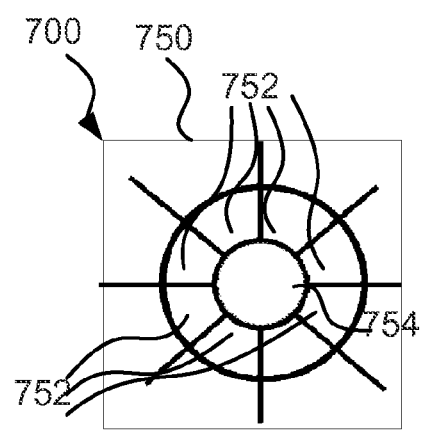
FIG. 7 depicts an embodiment of a plurality of bins for use in a histogram of gradients feature extraction technique.

Specifically, as may be appreciated, a gradient for a specific pixel may include an x (i.e., horizontal) and y (i.e., vertical) component that may be orthogonal to each other. With reference to FIG. 7, in a rotationally invariant approach to HOG, an image 700 may be represented in gradient domain 750. In the gradient domain, 750, N annular bins 752 may be established in addition to a low gradient region disposed in the center 754 of the N annular bins 752. In this regard, each annular bin 752 may correspond with a portion of a ring surrounding the center 754. FIG. 7 depicts an example of one arrangement of the annular bins 752 and center 754 as arranged in a plurality of cells 750 where there are 8 annular bins 752 and a single center 754. In another embodiment, a second gradient magnitude threshold may be defined to yield 2N+1 bins 752 (i.e., 16 annular bins 752 and one center bin 754). Each pixel from an image may be categorized into a bin 752 based on the direction and/or value of a gradient at the pixel as represented in the gradient domain 750.

Figure 8A:
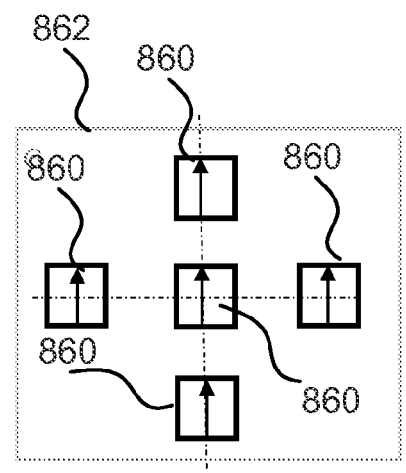
FIGS. 8A and 8B depict an embodiment of a graphical representation of a rotationally invariant histogram of gradients technique applied to an image.
Figure 8B:
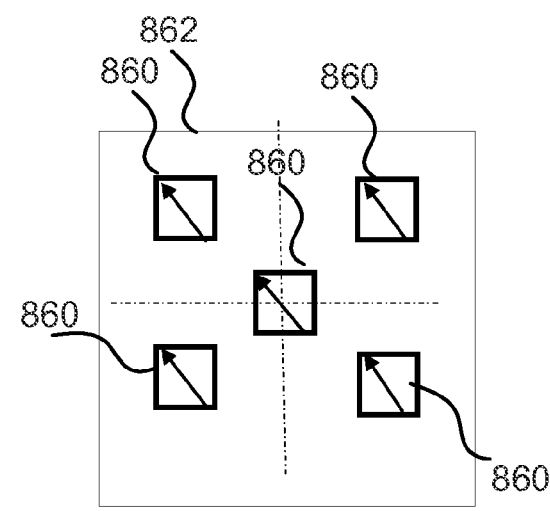

Additionally, as shown in FIGS. 8A and 8B, attached to a pixel may be a set of P pooling windows 860 with set relative offsets from the pixel. Also, a larger window 862, G, may be defined over which the gradients are to be histogrammed. The angular bin $N_i$ from the gradient domain 750 with the largest histogram value (from FIG. 7) is selected as the primary direction. That is, for the example shown in FIG. 7, one of the annular bins 752 is chosen based on the chosen angular bin having the largest histogram value. For each of the pooling windows 860, 2N angular bins may be stored to provide proper oversampling.

All P pooling windows 860 may be tied to the primary direction of the window 862 as determined from the selected angular bin 752 with the largest histogram value. Accordingly, shifting the pooling windows 860 to correspond to the primary direction results in only one degree of freedom is being lost over all windows when achieving rotational invariance. Once the primary direction is determined from selecting the angular bin 752 with the largest magnitude of histogram, the window 862 is also used to rotate the configuration compared to the primary direction. Accordingly, the pooling windows 860 shift position and the internal orientation of the pooling windows 860 may be rotated, as shown in FIG. 8B.

In an embodiment, integral images may be used to allow all pooling windows 860 to be calculated to generate a HOG for each pooling window 860. The internal orientation of the pooling windows 860 is rotated by shifting the resulting histogram by a fixed number of angular bins 852 determined for the window G 862.

Accordingly, this approach to HOG may provide for rotational invariance. As such, regardless of the orientation of the object to be identified, the HOG produced may be capable of producing useful features associated with the identification of such features. As may be appreciated, for VHR multispectral remotely-sensed Earth imagery, such rotational invariance may be particularly useful given the lack of uniform orientation of features to be identified.

Yet another feature extraction module 450 that may be provided is a Gabor wavelet feature extraction module with rotational invariance. In this regard, while Gabor filters have been utilized in edge detection of images in image processing, the Gabor wavelet feature extraction module described below may provide for rotational invariance, which as described above may be particularly beneficial in the context of VHR multispectral remotely-sensed Earth imagery.

In this regard, the image may be convolved with a Gabor wavelet functions as follows. For the real portion of the function, the following equation may be provided:

$$g(x, y; \lambda, \theta, \psi, \sigma, \gamma) = \exp\left(-\frac{x'^2 + \gamma^2 y'^2}{2\sigma^2}\right)\cos\left(2\pi\frac{x'}{\lambda} + \psi\right) \quad \text{Equation 6}$$

Furthermore, the imaginary component of the function may be represented by the function:

$$g(x, y; \lambda, \theta, \psi, \sigma, \gamma) = \exp\left(-\frac{x'^2 + \gamma^2 y'^2}{2\sigma^2}\right)\sin\left(2\pi\frac{x'}{\lambda} + \psi\right) \quad \text{Equation 7}$$

In both the functions provided above, the values of x' and y' may be provided as follows:

$$x' = x\cos\theta + y\sin\theta \quad \text{Equation 8}$$

$$y' = -x\sin\theta + y\cos\theta \quad \text{Equation 9}$$

In the foregoing equations, $\lambda$ represents the wavelength of the sinusoidal factor of the filter. The value of $\theta$ represents the orientation of the normal to the parallel stripes of the Gabor function. The value of $\psi$ is the phase offset, $\sigma$ is the sigma of the Gaussian envelope, and $\gamma$ is the spatial aspect ratio, which specifies the ellipticity of the support of the Gabor function.

Using the foregoing definitions of the Gabor wavelet functions, a calculation using the module is calculated for each pixel using different values of $\theta$. For instance, a plurality of orientations may be provided for the calculating including, for example, varying values at 22.5 degree increments (e.g., 0 degrees, 22.5 degrees, 45 degrees, 67.5 degrees, 90 degrees, 112.5 degrees, 135 degrees, 157.5 degrees, and 180 degrees). Other intervals may be utilized such as 11.25 degree increments, 45 degree increments, or other appropriate angular increments. In an embodiment, the calculations made for the various values of $\theta$ are made keeping the other variables for the Gabor filter constant. In other embodiments, the calculations may be made at each angular increment using different values for the other variables in the equation to establish a plurality of scales each calculated over the various intervals of $\theta$ as described above.

In any regard, once the values for each angular increment for each pixel have been calculated, the results of the calculations for the various intervals may be further processed to achieve rotational invariance. For example, in an embodiment, the sum of the absolute values of the results for all orientations at a given pixel may be calculated. That is, the sum of all calculations for each value of $\theta$ may be provided. In another embodiment, the sum of the magnitude for the values for the multiplication of convolution values for the Gabor functions that are perpendicular may be provided. That is, for example, the results of the calculation for the orientation (i.e., a $\theta$ value) of 0 degrees may be summed with the result of the calculation for the orientation of 90 degrees, the results of the calculation for the orientation of 22.5 degrees may be summed with the result of the calculation for the orientation of 112.5 degrees, and so on. Further still, the difference between the maximum and minimum values of the magnitudes of the calculations at the various orientations may be calculated for each pixel In this regard, the Gabor wavelet feature extraction module may output any of the foregoing values based on the calculations made at each orientation. In turn, the output may be rotationally invariant as the orientations calculated may account for rotations of features in the VHR remotely-sensed multispectral Earth images examined. In this regard, the various values described above calculated based on the results of the Gabor filter over the various orientation values may result in a rotationally invariant output for each pixel. As described above, such rotational invariance may be particularly useful in the context of remotely-sensed Earth images.

Another feature extraction module 450 that may be provided is a clustering histogram feature extraction module. The clustering histogram feature extraction module may include computing a histogram of cluster values in a predefined area surrounding a pixel. For example, each pixel of an image may be classified into a predefined set of classes. The classes may be established and the pixels may be categorized according to any appropriate technique. For example, in an embodiment a clustering technique such as k-means clustering using Euclidean or Mahalanobis distance may be used. In one particular embodiment for VHR remotely-sensed multispectral Earth images, the classes into which pixels are categorized may correspond to land classifications e.g. including land classes or land use classes defined for the image.

In any regard, once the pixels of the image are classified, for each pixel a histogram of cluster values for all pixels within a predefined distance of the pixel is created. The histogram may be built by counting the number of pixels within the predefined distance from the subject pixel that belong to each particular class. In this regard, the histogram may provide details regarding the nature of the surrounding pixels to any given pixel. In this regard, the histograms for the pixels of an image may provide useful information that may be particularly suited to the analysis of VHR remotely-sensed multispectral Earth imagery.

For instance, in the context of classification of land use or in object recognition, a feature that reflects the surrounding neighborhood of pixels may provide useful insight. For instance, it may be recognized that certain conditions may be recognized from the surrounding pixels when classifying the pixel or identifying an object. As an example, a dock may be surrounded by water such that a pixel belonging to a dock may reflect in the histogram created by the clustering histogram feature extraction module that neighboring pixels include those classified as water. As such, when identifying the dock or classifying the pixel, it may be recognized that a dock is generally surrounded by water. As such, the surrounding pixels may provide insight into properties of a given pixel, and such surrounding pixel information may be captured in the histogram created. Other examples may also be provided such as in an application of land use classification where, for example, the histogram for a number of surrounding pixels may provide insight into the type of land use (e.g., a mix of roads, roof and vegetation may indicate a residential area whereas a lack of vegetation may indicate a commercial area). In this regard, the clustering histogram feature extraction module may provide useful information that may be leveraged in further image analysis.

Another feature extraction module 450 that may be provided is a gray-level co-occurrence matrix (GLCM) module. The GLCM is a tabulation of how often different combinations of pixel gray level values occur in an image. As such, the GLCM may provide textural information regarding an image that may be useful in classification techniques. A full description of an embodiment of a GLCM module may be found in Hall-Beyer, *The GLCM Tutorial Home Page*, Version 2.10 available at http://www.fp.ucalgary.ca/mhall-bey/tutorial.htm, the entirety of which is incorporated herein by reference.

In turn, once a GLCM has been generated by the GLCM module, statistics may be generated based on the GLCM. For example, mean, variance, and correlation calculations may be performed. Furthermore, contrast groups may be calculated that are related to contrast use weights related to the distance from the GLCM diagonal. Examples include contrast calculations or "sum of squares variance" for the GLCM, dissimilarity calculations, or homogeneity calculations or "inverse difference moments". Additionally, orderliness groups may be calculated such as angular second moment calculations, maximum probability calculations, or entropy equations.

A number of parameters may be established for creation and use of GLCMs in the GLCM module. For instance, the size of the window over which a GLCM is calculated may be provided as a variable definable by a user. In this regard, the window is preferably large enough to cover features to be identified, but small enough to be localized. For example, calculation of the GLCM in a forest must at least have a window size large enough to identify a tree or calculation of the GLCM in an agricultural field may have a window size roughly correlated to the row spacing of crops planted in the field. Furthermore, the direction of the offset of the GLCM may be definable as may be the bands for which the GLCM is calculated and the measures (e.g., those described above) calculated for the GLCM.

Yet further feature extraction modules 450 may be provided without limitation. An example of a further feature extraction technique that may be utilized include a mean feature approach. In this approach, the mean values for all bands based on a defined kernel are extracted. The kernel may be sized, for example, to be a 3×3 pixel kernel although other values may be used. In this regard, the mean feature module may provide smoothing over the kernel.

Another feature extraction module 450 that may be used includes a digital elevation model (DEM) module that may analyze image data in relation to a DEM. In this regard, some land classes may be tied to relatively flat areas (e.g., crops, wetlands, etc.). A such, a module may generate features based on a DEM corresponding to the geography covered by the image. In addition to providing useful information directly related to land classes, reference to DEM data for a portion of the image may influence illumination of various portions of the image that may be accounted for in processing (e.g., identification of shady areas based on elevation profiles).

As may be appreciated, the foregoing feature extraction models 450 may generate data layers for the feature stack 500 that may each be particularly suited for various analysis tasks carried out relative to the image data 411. In this regard, a user may be capable of selecting one or more of the feature extraction modules 450 for execution with respect to image data 411 (e.g., including the identity or order of the modules 450). Further still, at least one parameter related to the execution of a feature extraction module 450 may be adjustable by a user to tailor the feature extraction module 450 to a particular application. In this regard, the selection of certain ones of the feature extraction modules 450 and/or customization of parameters related thereto may facilitate improved processing efficiency as unused and/or unhelpful feature data layers may not be generated based on a user's selection of a limited set of the feature extraction modules 450.

Furthermore, the feature modules 450 may be automatically executed as part of an analysis process. For instance, the data store 410 may be accessible by an image processing module 460 that may be operable to execute analysis with respect to image data 411 and/or feature data 420. Examples of image processing modules 460 may include land use/land classification modules, data mining modules, indexing modules, object detection modules, change detection modules, parameter monitoring modules, or any other appropriate image analysis module that may analyze image data 411 and/or feature data 420. In any regard, the image processing module 460 may provide instructions regarding the identity and/or order of application of feature extraction modules 450 to the image data 411. For example, the image processing module 460 may provide a request in the interface format 440. Thus, the feature extraction system 400 may autonomously and automatically, in response to the request from the image processing module 460, operate feature extraction modules 450 on image data 411 to generate feature data 420. In this regard, the system 400 may determine a subset of the plurality of feature extraction modules 450 to be executed in response to a request by an image processing module 460. Furthermore, a sequence or order of operation of feature extraction modules 450 may be determined. Furthermore and as described above, the feature extraction modules 450 may be at least partially hierarchical such that a first feature extraction module 450 may generate feature data 420 using feature data 420 generated by another of the feature extraction modules 450. As such, the system 400 may operate in at least a partially autonomous or automatic manner to generate feature data 420 for use in image analysis by the image processing module 460.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for extracting feature data from very high resolution (VHR) remotely-sensed multispectral Earth imagery, comprising:
   storing VHR remotely-sensed multispectral Earth image data in a file system;
   providing a plurality of feature extraction modules, wherein each respective feature extraction module is operable to analyze the image data to generate feature data regarding the image data;
   accessing the VHR remotely-sensed multispectral Earth image data in the file system with at least a first of the plurality of feature extraction modules, wherein the plurality of feature extraction modules are operable to read data from and write data to the file system using a common interface format;
   executing the first feature extraction modules to access the file system using the common interface format and generate first feature data corresponding to the VHR remotely-sensed multispectral Earth image data;
   receiving the first feature data at the file system from the first feature extraction module, wherein the first feature data is received from the first feature extraction module using the common interface format;
   executing a second feature extraction module to access at least the first feature data in the file system using the common interface format, wherein first feature data generated from the execution of the first feature extraction module is used during the executing of the second feature extraction module to generate second feature data; and
   receiving the second feature data at the file system from the second feature extraction module, wherein the second feature data is received from the second feature extraction module using the common interface format.

2. The method of claim 1, wherein the VHR remotely-sensed multispectral Earth image data comprises spectral band data corresponding to at least 8 multispectral bands.

3. The method of claim 2, wherein the multispectral bands collectively range from at least about 300 nanometers in wavelength to at least about 1100 nanometers in wavelength.

4. The method of claim 2, wherein the image data further comprises a plurality of short-wavelength infrared (SWIR) bands.

5. The method of claim 4, wherein the plurality of SWIR bands range from at least about 1100 nanometers in wavelength to at least about 2400 nanometers in wavelength.

6. The method of claim 1, wherein feature data received from the plurality of feature extraction modules is stored in corresponding relation to the portion of the VHR remotely-sensed multispectral Earth image data from which the feature data was generated.

7. The method of claim 1, wherein first feature extraction module and the second feature extraction module comprise different programming languages.

8. The method of claim 1, wherein the first feature extraction module and the second feature extraction module are independently developed and each communicate with the file system using the common interface format.

9. The method of claim 1, wherein the common interface format comprises a feature identifier and an image identifier.

10. The method of claim 9, wherein the feature identifier corresponds with particular feature data generated by a given feature extraction module.

11. The method of claim 10, wherein the image identifier comprises an indication of a portion of the image for which feature data is to be generated.

12. The method of claim 11, further comprising:
    determining a subset of the plurality of feature extraction modules, at least including the first feature extraction module and the second feature extraction module, required to generate feature data.

13. The method of claim 12, wherein the determining further comprises ordering the execution of the first and second feature extraction modules.

14. The method of claim 12, further comprising:
    distributing an initialization command to each of the first and second feature extraction modules, wherein the initialization command comprises a feature identifier and an image identifier according to the common interface format.

15. The method of claim 1, wherein at least one of the feature extraction modules generates feature data prior to receiving a request for the feature data from an image processing module.

16. The method of claim 1, wherein at least one of the feature extraction modules generates feature data on demand in response to a request for the feature data from an image processing module.

17. The method of claim 13, wherein the determining is at least partially based on a feature of interest to be identified from the image data as requested from an imaging processing module.

18. The method of claim 13, wherein at least one of the feature extraction modules comprises a total variational (TV) feature extraction module.

19. The method of claim 18, wherein the TV feature extraction module comprises a multispectral filtering module using a plurality of spectral bands of an image to generate a filtered image corresponding to the image.

20. The method of claim 19, wherein the number of spectral bands used in the filtering operation comprises at least 8 multispectral bands.

21. The method of claim 20, wherein the filtering operation comprises minimizing a function including at least a first term representing the difference between the image and the filtered image and at least a second term representing the spatial homogeneity of the filtered image.

22. The method of claim 21, wherein the first term and the second term include a multivalued vector for each pixel representative of the image or filtered image, respectively, wherein the multivalued vector values include a component for each row, column, and multispectral band in the image.

23. The method of claim 22, wherein at least one of the first term or the second term include an L1 norm.

24. The method of claim 23, wherein the second term is weighted by a smoothing factor.

25. The method of claim 24, wherein the minimization of the function is solved using a Split Bregman technique.

26. The method of claim 25, wherein the Split Bregman technique includes Gauss-Seidel updates.

27. The method of claim 26, wherein the minimization is solved by execution on a graphics processing unit (GPU).

28. The method of claim 1, wherein at least one of the feature extraction modules comprises a Gabor wavelet feature extraction module.

29. The method of claim 28, wherein the Gabor wavelet feature extraction modules is operative to generate feature data by:
  applying a plurality of Gabor wavelet functions to an image, wherein each of the plurality of Gabor wavelet function includes a different orientation; and
  computing at least one feature based on at least two of the plurality of Gabor wavelet functions.

30. The method of claim 29, wherein the at least one feature comprises at least one of a sum of the absolute values of a first Gabor wavelet function of the plurality of Gabor wavelet functions and a second Gabor wavelet function of the plurality of Gabor wavelet functions, a sum of the magnitude of values of the product of each perpendicularly oriented Gabor wavelet function of the plurality of Gabor wavelet functions, and the difference of the maximum and minimum values of magnitude of all of the plurality of Gabor wavelet functions for all image data.

31. The method of claim 30, wherein for each orientation of the plurality of Gabor wavelet functions, a plurality of different Gabor wavelet functions with a different scale are calculated.

32. The method of claim 31, wherein the different scales comprise varied values for at least one of a wavelength of the Gabor wavelet function or an envelope of the Gabor wavelet function.

33. The method of claim 32, wherein each of the plurality of Gabor wavelet functions are applied to each pixel of each multispectral band of an image comprising a plurality of multispectral bands.

34. The method of claim 33, wherein the at least one feature is determined independently for each of the plurality of bands.

35. The method of claim 34, wherein the at least one feature is determined with respect to all of the plurality of bands.

* * * * *

UNITED STATES PATENT AND TRADEMARK OFFICE
CERTIFICATE OF CORRECTION

PATENT NO. : 9,569,690 B2  
APPLICATION NO. : 14/826740  
DATED : February 14, 2017  
INVENTOR(S) : Marchisio et al.

Page 1 of 1

It is certified that error appears in the above-identified patent and that said Letters Patent is hereby corrected as shown below:

On the Title Page

Item (74), delete "fischmann" and insert therefore --Fischmann--

In the Specification

Column 24, Line 42, delete "Breqman" and insert therefore --Bregman--

In the Claims

Column 29, Line 64, delete "modules" and insert therefore --module--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*